March 19, 1968 T. T. OLAFSON 3,373,523
CRAB TRAPS OR POTS
Filed June 24, 1965 2 Sheets-Sheet 1
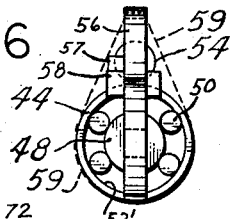
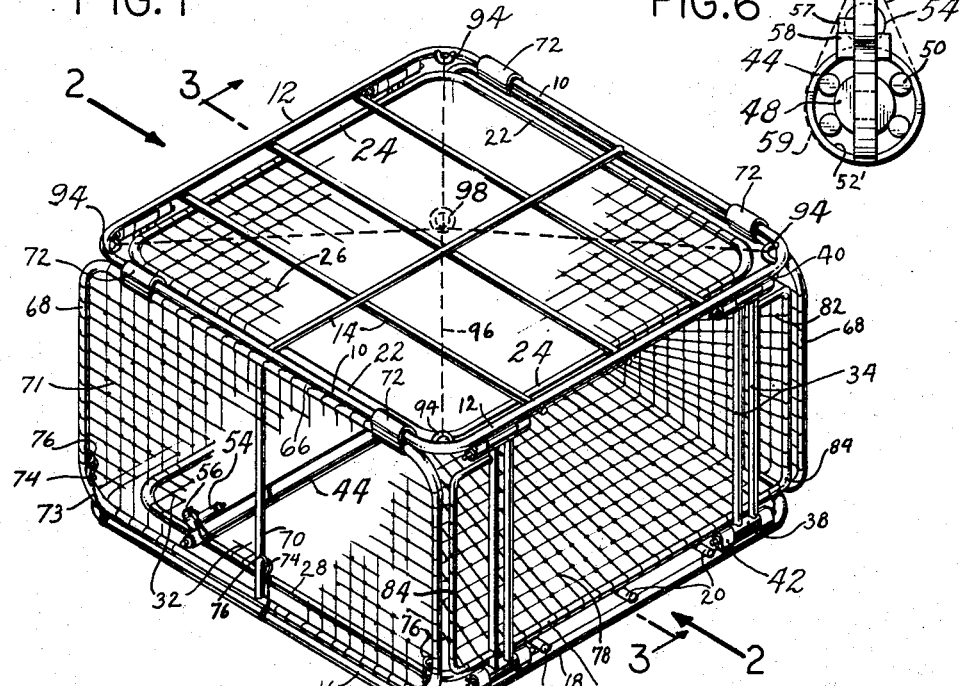
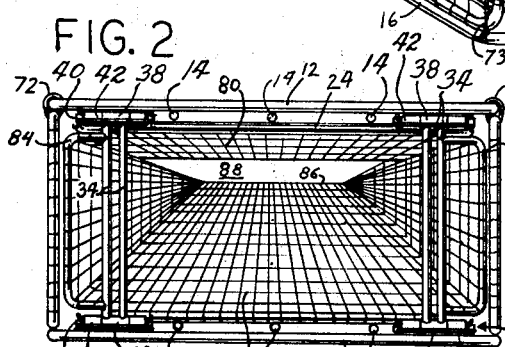
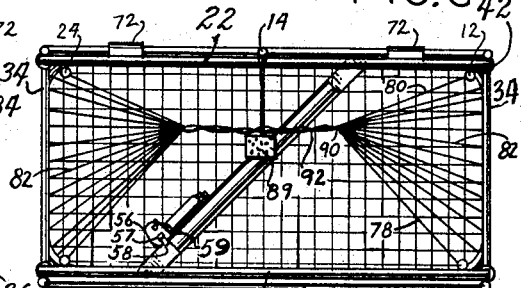
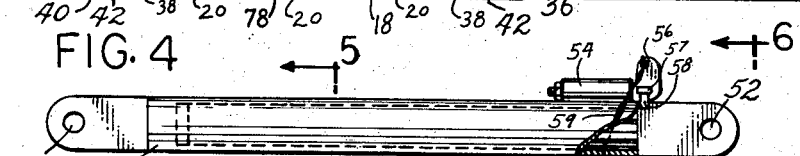
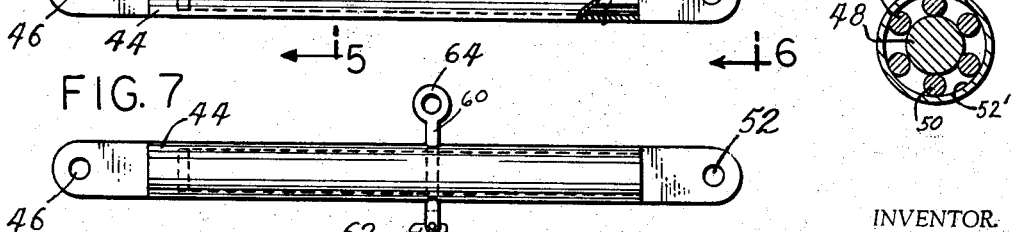
INVENTOR.
THEODORE T. OLAFSON
BY TW Secrest March 19, 1968 — T. T. OLAFSON — 3,373,523
CRAB TRAPS OR POTS Filed June 24, 1965 — 2 Sheets-Sheet 2

INVENTOR.
THEODORE T. OLAFSON
BY T W Secrest

United States Patent Office 3,373,523
Patented Mar. 19, 1968

3,373,523
CRAB TRAPS OR POTS
Theodore T. Olafson, Box 251, Kodiak, Alaska 99615
Filed June 24, 1965, Ser. No. 466,767
9 Claims. (Cl. 43—100)

ABSTRACT OF THE DISCLOSURE

This invention relates to a collapsible crab pot or trap, characterized in general by having outer spaced apart top and bottom frame members having end and side rails. A plurality of link members pivotally interconnect the end rails of said top and bottom frame members. Mesh covered inner top and bottom frame members, having end and side rails, are secured respectively to said outer top and bottom frame members. A variable length diagonal brace is pivotally interconnected to the end rails of the inner frame members. Mesh covered, hingedly mounted door means are carried by said outer frame members. Also, crab entrance tunnels to the interior of the crab pot are provided.

My invention relates to crab traps, commonly referred to as crab pots, and most particularly concerns itself with the type of crab pots which are carried aboard ship and generally on the deck thereof, are discharged from the ship and located at suitable locations on the floor of the sea and there left to accumulate trapped crabs. Upon subsequent voyages of the ship, the crab pots are raised to the surface and their crab contents are discharged into a hold of the ship and then the crab pots are reset for the purpose of trapping or catching additional crabs.

It is an object of my invention to provide a collapsible crab pot of a nature, which when not in crab fishing use, can be readily collapsed to a minimum size to require a minimum usage space when either in storage or as a part of a load on a vessel. Generally the crab pots are carried as a deck load on the fishing vessel and to make a seaworthy deck load and to make one which can be readily handled, collapsibility to a minimum size is an essential and the operative parts must be such as to withstand the elements in handling, storage, and while in actual use on the floor of the sea.

Another object of my invention is to provide a crab pot construction which has a door construction facilitating ready discharge of live crawling crabs which otherwise have a tendency to maintain themselves in the crab pot.

Another object of my invention is to provide a construction wherein the movable parts do not tend to become corroded and resist turning movement because of exposure to the elements in and about the sea.

Another object of my invention is to provide a crab entrance tunnel terminating within the crab pot, which is of a construction to minimize the chance of crabs escaping once they have entered into the crab pot.

Another object of my invention is to provide a crab pot of a construction to withstand wear and tear incident to the raising and lowering of crab pots from a ship into the sea water or from the sea water back onto the deck of the ship.

Other objects and advantages of my invention will become apparent as the description of the same proceeds and the invention will be best understood from a consideration of the following detailed description, taken in connection with the accompanying drawings, forming a part of this invention, with the understanding, however, that the invention is not to be limited to the exact details of the construction shown and described since obvious modifications will occur to a person skilled in this art.

In the drawings,

FIGURE 1 is a perspective view, with portions of mesh material being broken away to clarify the drawing, of a crab pot embodying my invention;

FIG. 2 is an end elevation looking generally in the direction of the arrow 2 of FIGURE 1 of the drawings;

FIG. 3 is a sectional view, with parts in elevation, taken substantially on broken line 3—3 of FIG. 1;

FIG. 4 is a detached view, with parts broken away, of the diagonal brace shown in the previous figures;

FIG. 5 is a sectional view taken substantially on broken line 5—5 of FIG. 4;

FIG. 6 is an end elevational view taken substantially on broken line 6—6 of FIG. 4;

FIG. 7 is an elevational view somewhat similar to FIG. 4 of a modified form of diagonal brace which may be used in my invention.

Figure 8:
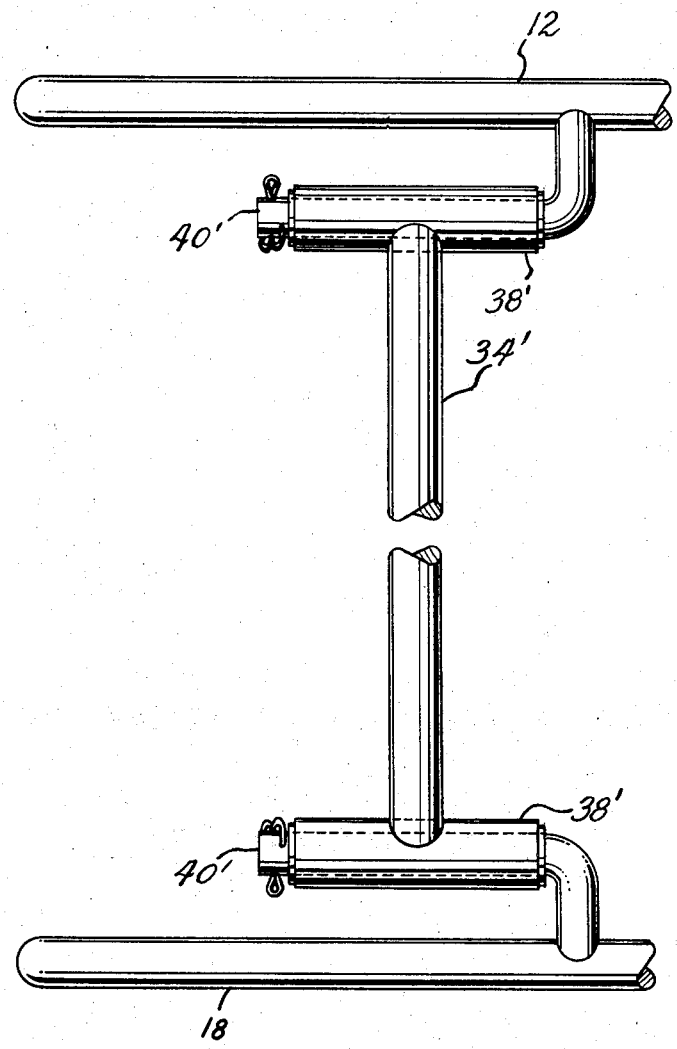
FIG. 8, on an enlarged scale, illustrates a modification of the hinge member.

Now referring to the drawings, I provide outer top and bottom frame members, which may be identical in construction, and the top frame member comprises side rails 10 and end rails 12 defining a rectangular configuration. The said side rails 10 and end rails 12 may be made from a continuous bar and with the joining ends welded together to form a single piece. The outer top frame member is made to be relatively rigid by the use of reinforcing bars 14, some of which are generally parallel to the side rails 10 and others of which are generally parallel to the end rails 12. Where such reinforcing bars 14 cross or contact rails 10 and 12, they may be a weldment to further enhance the rigidity of the outer top frame member. The outer bottom frame member may be identical with the outer top frame member, is not further described, and comprises side rails 16, end rails 18, and reinforcing bars 20.

Adjacent and below the outer top frame member and adjacent and above the outer bottom frame member are identical inner top and bottom frame members. The inner top frame member comprises side rails 22, and rails 24, and a covering member 26 made of wire mesh, such as hardware cloth, all secured together. The side rails 22 and end rails 24 may be formed from a continuous piece or rod of metal and bent into the shape of a rectangle of smaller size than the associated outer top frame member and then with the adjoining ends welded together to form a single piece construction. The hardware cloth 26 is generally in the nature of a wire screen with rectangular openings and with the crossing wires welded together to form a solid and sturdy construction and with the hardware cloth 26 secured to the side rails 22 and the end rails 24, as by welding. Also, the said inner top frame member is secured to the outer top frame member as by welding the side and end rails 22 and 24 of the inner top frame member to the reinforcing bars 14. Thus, the inner top frame member comprising parts 22, 24, and 26 is made relatively rigid and is protected by the outer top frame members 10, 12, 14.

There is an identical inner bottom frame member and, in the interest of brevity, a detailed description of the same is not necessary and the same comprises side rails 28, end rails 30, and wire mesh, as hardware cloth, 32.

With such construction of a top member comprising the top outer frame as well as the top inner frame and with the bottom member of similar construction, the said tops and bottoms are very rigid and will withstand the elements whether in fishing use or in storage. They also will withstand normal wear and tear which is of a rough character and is inherent in the removal of the crab pots from the deck of a ship and locating them at suitable sea locations and later recovering the crab pots and landing them on the deck of a ship and in maneuvering the crab pots to unload the same of crabs which may be trapped.

Such relatively rigid top and bottom members are secured together by a plurality of link members each pivoted at an upper end portion to an end rail 12 of the outer top frame member and at their other end pivotally connected to the end rails 18 of the bottom outer frame members. Such link members are preferably relatively wide and as an illustration thereof I have shown in FIGURES 1 and 2 two bars 34 having bearings 36 at each end thereof. The bearings 36 have sleeves 38 extending to a substantial extent and parallel to the end rails 12 or 18. The extended surface is desired to provide bracing against possible crosswise movement of the top frame members relative to the bottom frame members in a direction generally parallel to the end rails 12 or 18. Each sleeve 38 is provided with a lining or sleeve insert made of plastic so as to prevent corrosion or rusting of the bearing surface, in which is mounted the pin or rod 40 of the bearing 36. The pins or rods 40 are carried by hangers 42 and in turn the hangers 42 are secured, as by welding, to end rails 12 and 18. The construction provides for removable pins 40 to aid in installation and repair. The bearings 36 should be characterized by having a long extended bearing surface parallel to the end rails 12 and 18, to prevent tilting or canting crosswise movement, and at the same time the bearing surfaces of said bearings 36 should be plastic surfaces so as to minimize interference with the operation of the bearings because of corrosion and rust. Due to the fact that the crab pots operate in sea water or in adjacent air, rust and corrosion is ever a problem and I have found that by having a plastic bearing surface at the area of turning, that I have substantially removed rust and corrosion problems in the bearings so that the bearings move freely and are not a source of any substantial trouble.

In FIG. 8 of the drawings, another form of connecting bars 34 between end rails 12 of the outer top frame and the end rails 18 of the bottom frame member is shown. In this figure, a rod 40' is integral with (as by welding) the rails 12 and 18 and forms a hinge pin of a bearing. A sleeve 38' may be integral with a bar 34' (as by welding) and forms the other part of the bearing. With this construction a slight modification is illustrated wherein the rods 12 and 18 are linked together by a bar means 34' pivoted at its end portions with said rods 12 and 18. The parts 38', 34', and 40' are, obviously, the counterparts of 38, 34, and 40 and by the scale of FIG. 8, the parts 38, 34 and 40 may be better visualized and understood.

As indicated by the drawings, there are at least two spaced apart link members connecting between the top and bottom members and at both ends of the pot. In some instances the width of the crab pot may be such that more links, as three link members will be useful at each end of the crab pot.

From the foregoing it will be readily apparent that the construction described will provide for the top outer frame member 10, 12, 14 and the outer bottom frame member 16, 18, 20 to move relatively toward or away from each other with angular movement of the bars 34 of the link members and with bracing against movement of such parts in a crosswise direction.

A diagonal brace in the preferred form is shown detached in FIG. 4. This diagonal brace comprises an internally bored sleeve 44 terminating in an end portion having an opening 46 therein so that said sleeve 44 can be pivotally connected with a side rail 22 of the inner top frame member and along the outside thereof. Mounted for sliding traveling movement within the sleeve 44 is a piston-like member preferably comprising an internal rod 48 (see FIG. 6) surrounded by a plurality of rods 50 so that any water which may get into the sleeve 44 will tend to drain downwardly past the rod 48 and the openings 52' between the rod 48 and the sleeve 44 and between the said rods 50. The piston or shaft composed of said rods 48, 50 is slidably mounted within the internal bore of the sleeve 44 and terminates in an end portion having an opening 52 therein providing for pivotally connecting the link members on either side of the device to the outside surface of side rails 28 of the inner bottom frame member.

It will be apparent that as the top and bottom frame members move relatively toward each other, that the telescoping link members will be extended to their maximum length and that when the crab pot is erected into the position shown in FIG. 1 of the drawings, said link members will have their shortest length. Thus, in order to secure the telescoping link members at a minimum length, I provide a rotary catch member in FIG. 4, which has a sleeve housing member 54 welded to the sleeve 44 and the piston-catch member 56 is mounted for turning movement in 54. The rod 48, 50 carries a catch-engaging bar 58 which may be formed integrally with the end portion which also carries the opening 52. Thus, upon turning the catch member 58 at right angles to that shown in FIG. 4 of the drawings, the two telescoping parts of the diagonal link member can assume a desired length and upon erection of the crab pot to the position shown in FIG. 1 of the drawings, the catch member 56 may be turned and engaged with the catch bar 58 and thus the crab pot may be maintained in erected position as lengthening of the link members is prevented by the engagement of the catch member 56 with the catch bar 58. As a means to prevent inadvertent turning of catch member 56, I have illustrated a rubber band 59 resiliently urging catch member 56 against a stop 57 secured to end portion of rods 48, 50 which carries opening 52. Preferably the sleeve 44 and the internal bearing surface of 54 are provided with plastic liners so as to eliminate friction problems which may be caused by corrosion and rust.

In FIG. 7 of the drawings I have shown an alternate type of brace and the only change resides in the elimination of the parts 54, 56, 57, 58, and 59 and with the substitution of another type of catch means obtaining the same results. Thus, the remaining parts of the construction of FIGS. 4 and 5 are incorporated by reference in FIG. 7 and such parts, as they show, bear similar reference numerals in FIG. 7 to those of FIGS. 4 and 5. Also, the alternate brace of FIG. 7 will be employed in the same way and for the same purposes as the previous brace except for the new structure next mentioned. In said FIG. 7, the telescoping members are both drilled so that they provide a common opening obtaining from registering openings in sleeve 44 and rods 48, 50 resulting when the overall length of the leg member is at its minimum. Through such an opening is positioned an eye bolt 60 having a pivotal retaining means 62 and an eye bolt 64. The eye 64 can be secured to any suitable strap (not shown) so that the eye bolt will not be lost and will always be readily available. It is believed the operation of the construction of FIG. 7 is readily apparent from the foregoing.

Doors are provided at each side portion of the trap and the doors are the full length of each side. It must be remembered that the crab pot is designed to be filled with live crawling crabs having two pincers, at least one of which is often used by crabs to crack clam shells in pursuit of food. Within the crab pot is no place for one to use hands even with very sturdy gloves to remove the crabs. Thus, a door covering each otherwise completely open side is very essential for success in ready unloading.

I provide doors which preferably connect between the side rails 10 of the top outer frame members and the side rails 16 of the bottom outer frame members. These doors each comprise longitudinal rails 66 and vertical rails 68. Preferably said rails 66 and 68 are formed from one piece and the free ends welded together to form a continuous rectangular bar frame. Also, preferably and intermediate the vertical rails 68 is provided an additional bracing rail 70. This rail 70 may be secured to a top rail 66 and a bottom rail 66 as by welding. Also, the door is covered by suitable metal screen as hardware cloth 71 and the same may be secured in place as by welding. Preferably the doors are hinged at the top so that during unloading, the doors may be swung and laid upon the top of the pot and thus will be out of the way. In this connection, I have provided bearings 72 hinging the door at the top and any suitable means may be employed to secured the bottom of the door to the frame, such as by lashings or any suitable means so that the bottom of the door is held relatively rigid with the bottom rails 16 and parts connected therewith. In the drawings I have shown a cord member 73 connected at one end portion to a side rail 16 and terminating in a hook 74. The hook 74 thus may be attached or detached from eyes 76 carried by vertical rails 68 or by bracing rail 70. The doors not only function as closure means, which may be opened to provide the opening through which crabs may be removed from the crab pot, but when closed, they also provide for bracing action of the crab pot and augment the function of the diagonal braces shown in FIGS. 4, 5, 6, and FIG. 7. Obviously, if the door is held relatively rigid to the top and bottom frame members, then the top and bottom frame members cannot relatively move as respects each other on the bearings 36. Thus, I provide dual means tending to maintain the crab pot in erect position which will both function to either augment each other or operate in the event of failure of the other when the crab pot is in use and is below the surface of the sea water.

I provide an entrance tunnel from each end of the crab pot and the walls thereof are formed from flexible netting so as not to interfere with the erection or collapsing of the crab pot. The material should be selected as one of strength and durability in sea water use and around air adjacent sea water condition. Thus, nylon fish net or webbing is very useful. The walls of the tunnel comprise a bottom wall or floor 78, a top wall 80 and side walls 82. At the open end of the tunnel said walls are connected to the end rails 24 of the inner top frame member and at the bottom to the end rails 30 of the inner bottom frame member. The side walls 82 of the tunnel are connected to extension frame members 84, one of which is disposed on either side and each thereof is carried by the bars 34. Thus, the extension frames 84 will pivotally move with the said bars 34. The side walls 82 converge inwardly toward each other as the tunnel extends inwardly into the crab pot and the bottom wall 78 and the top wall 80 converge toward each other and toward the common line 86 which may be the terminus of the bottom wall 78. However, the top wall 80 is cut away short of said line 86 to provide opening 88 which is the crab exit opening from the tunnel and in turn the crab entrance opening into the crab pot. The crabs tend to crawl up the bottom wall 78, seeking the food deposited by bait 89 suspendedly supported in the crab pot, but fall over the terminal edge of bottom wall 78, defined by said line 86. I have found that my construction and inherent mode of operation is such that crabs do not find their way out of the crab pot once they have entered the same and fallen or gone over the edge of the top of the bottom wall 78. The relative angular inclination of the bottom wall 78 and the top walls 80 may be varied as desired but the edge of the bottom wall 78 as indicated by the line 86 should be high enough in the crab pot to maintain a maximum possible utilization of the space in the crab pot. In other words, the space between said common line 86 should be high enough so as not to have the top of the crab pot interfere with the crabs entering the opening 88 and at the same time the elevation of the top 86 of the bottom wall 78 should be high enough to provide for maximum utilization of the interior space within the crab pot.

To maintain the inner apex portions of the tunnels extending from each end of the crab pot inwardly, I provide for hooks 90 and elastic members 92, so when hooked in place, they tend to keep the tunnels form-retaining with the weight of the crabs thereon and at the same time, when released, provide flexible characteristics so that the said tunnelways can be readily folded and will not in any wise interfere with the collapsing or erection of the crab pot.

In order to utilize ship gear to raise and lower the crab pots by fish gear in the water, eyes 94 are preferably provided at the corners of outer top frame member 10, 12, and thus a bridle 96 having a hook-engaging eye 98 provides suitable accessories so that a hook from the ship's gear can be engaged with said eye 98 and the crab pots raised or lowered as desired during handling of the crab pots.

It is to be understood that the form of my invention, herewith shown and described is to be taken as a preferred example of the same, and that various changes in shape, size and arrangement of the parts may be resorted to, without departing from the spirit of my invention, or the scope of the subjoined claims.

I claim:

1. A crab pot comprising vertically spaced apart outer top and bottom frame members, each being substantially rectangular in form and having end rails and side rails; a plurality of link members, each pivoted at an upper end portion to an end rail of said outer top frame member and at a lower end portion to an end rail of said outer lower frame member; a covered inner top frame member having substantially parallel end rails and substantially parallel side rails and which inner top frame member is secured to and carried by said outer top frame member; a covered inner bottom frame member having substantially parallel end rails and substantially parallel side rails and which inner bottom frame member is secured to and carried by said outer bottom frame member; a variable length diagonal brace pivotally connected at its lower end portion to a rail of said inner bottom frame member and pivotally connected at its upper end portion to the rail directly thereabove of said inner top frame member; catch means for said diagonal brace operable to fix the relative length of the same; and door means for each side of the crab pot, each of said door means having a top edge portion secured to a side rail of said outer top frame member and a bottom edge portion detachably secured to said outer bottom frame member; and entrance means at each end of said frame members.

2. A crab pot comprising vertically spaced apart outer top and bottom frame members, each being substantially rectangular in form and having end rails and side rails; a plurality of link members, each pivoted at an upper end portion to an end rail of said outer top frame member and at a lower end portion to an end rail of said outer lower frame member; a covered inner top frame member having substantially parallel end rails and substantially parallel side rails and which inner top frame member is secured to and carried by said outer top frame member; a covered inner bottom frame member having substantially parallel end rails and substantially parallel side rails and which inner bottom frame member is secured to and carried by said outer bottom frame member; a variable length diagonal brace pivotally connected at its lower end portion to a rail of said inner bottom frame member and pivotally connected at its upper end portion to the rail directly thereabove of said inner top frame member, said brace comprising two telescopingly sliding members; catch means for said diagonal brace operable to fix the relative minimum length of the same; and door means for each side of the crab pot, each of said door means having a top edge portion secured to a side rail of said outer top frame member and a bottom edge portion detachably secured to said outer bottom frame member; and entrance means at each end of said frame members.

3. The combination of claim 2 wherein said catch means comprising a rotatable catch is carried by one of said telescopingly sliding members and a catch engageable bar is carried by the other thereof.

4. The combination of claim 2 wherein said catch means comprises registerable openings in said telescopingly sliding members and removable pin means therein.

5. A crab pot comprising vertically spaced-apart outer top and bottom frame members, each being substantially rectangular in form and having end rails and side rails; a plurality of link members, each pivoted at an upper end portion to an end rail of said outer top frame member and at a lower end portion to an end rail of said outer lower frame member, each of the bearing surfaces of said pivots extending to a substantial extent and in a direction parallel to said end rails and bracing the top and bottom frame members against relative crosswise movement; a covered inner top frame member having substantially parallel end rails and substantially parallel side rails and which inner top frame member is secured to and carried by said outer top frame member; a covered inner bottom frame member having substantially parallel end rails and substantially parallel side rails and which inner bottom frame member is secured to and carried by said outer bottom frame member; a variable length diagonal brace pivotally connected at its lower end portion to a rail of said inner bottom frame member and pivotally connected at its upper end portion to the rail directly thereabove of said inner top frame member; catch means for said diagonal brace operable to fix the relative length of the same; the door means for each side of the crab pot, each of said door means having a top edge portion secured to a side rail of said outer top frame member and a bottom edge portion detachably secured to said outer bottom frame member; and entrance means at each end of said frame members.

6. A crab pot comprising vertically spaced apart outer top and bottom frame members, each being substantially rectangular in form and having end rails and side rails; a plurality of link members, each pivoted at an upper end portion to an end rail of said outer top frame member and at a lower end portion to an end rail of said lower frame member; a covered inner top frame member having substantially parallel end rails and substantially parallel side rails and which inner top frame member is secured to and carried by said outer top frame member; a covered inner bottom frame member having substantially parallel end rails and substantially parallel side rails and which inner bottom frame member is secured to and carried by said outer bottom frame member; a variable length diagonal brace pivotally connected at its lower end portion to a side portion of a side rail of said inner bottom frame member and pivotally connected at its upper end portion to a side portion of the rail directly thereabove of said inner top frame member; catch means for said diagonal brace operable to fix the relative length of the same; and door means for each side of the crab pot, each of said door means having a top edge portion secured to a side rail of said outer top frame member and a bottom edge portion detachably secured to said outer bottom frame member; and entrance means at each end of said frame members.

7. A crab pot comprising vertically spaced apart outer top and bottom frame members, each being substantially rectangular in form and having end rails and side rails; a plurality of link members, each pivoted at an upper end portion to an end rail of said outer top frame member and at a lower end portion to an end rail of said outer lower frame member; a covered inner top frame member having substantially parallel end rails and substantially parallel side rails and which inner top frame member is secured to and carried by said outer top frame member; a covered inner bottom frame member having substantially parallel end rails and substantially parallel side rails and which inner bottom frame member is secured to and carried by said outer bottom frame member; a variable length diagonal brace pivotally connected at its lower end portion to a rail of said inner bottom frame member and pivotally connected at its upper end portion to the rail directly thereabove of said inner top frame member; catch means for said diagonal brace operable to fix the relative length of the same; a hingedly mounted covered door means carried by said outer top and bottom frame members for each side of the crab pot; and entrance means at each end of said frame members.

8. The combination of claim 7 wherein said diagonal brace comprises two telescopically sliding members, and the catch means is operable to fix the relative minimum length of the diagonal brace.

9. The combination of claim 7 wherein each of the bearing surfaces pivoting the link members to the end rails of the top frame member comprises bearing surfaces extending to a substantial extent and in a direction parallel to said end rails bracing the top and bottom frame members against relative crosswise movement.

References Cited

UNITED STATES PATENTS

| | | | |
|---|---|---|---|
| 1,171,924 | 2/1916 | Brown | 220—6 |
| 1,425,587 | 8/1922 | Hammond et al. | 220—6 |
| 2,769,274 | 11/1956 | Ougland | 43—105 |
| 3,184,881 | 5/1965 | Jatzeck | 43—102 |
| 3,198,372 | 8/1965 | Witrant | 220—6 |

SAMUEL KOREN, *Primary Examiner.*

WARNER H. CAMP, *Examiner.*